July 10, 1928.  
J. MOREAU  
1,677,001

LUBRICATING DEVICE FOR AXLE JOURNALS

Filed Dec. 23, 1926  2 Sheets-Sheet 1

Inventor
Jules Moreau,
Atty.

July 10, 1928.
J. MOREAU
1,677,001
LUBRICATING DEVICE FOR AXLE JOURNALS
Filed Dec. 23, 1926    2 Sheets-Sheet 2
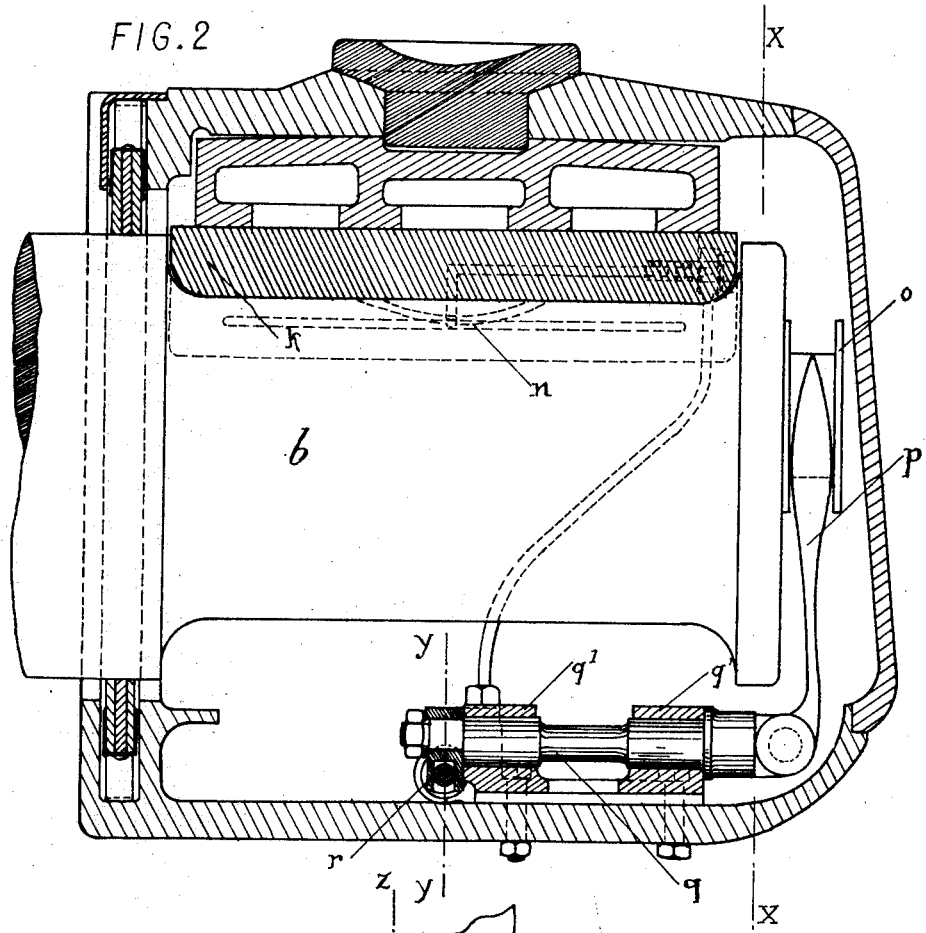
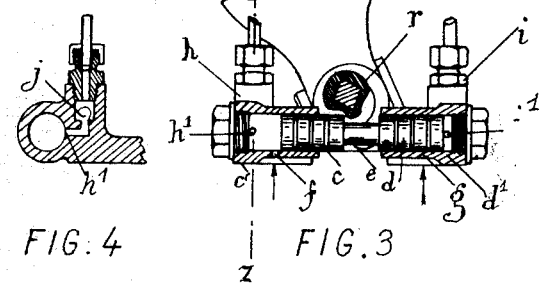
Inventor,
Jules Moreau,
Atty.

Patented July 10, 1928.

1,677,001

UNITED STATES PATENT OFFICE.

JULES MOREAU, OF LA GARENNE-COLOMBES, FRANCE.

LUBRICATING DEVICE FOR AXLE JOURNALS.

Application filed December 23, 1926, Serial No. 156,660, and in France January 20, 1926.

The lubrication of axle journals for railway vehicles and particularly for tramway vehicles, as well as for analogous rolling stock, is usually effected by means of an oiling member of textile material which is disposed in the lower part of the axle box and absorbs the oil by capillary action.

The present invention relates to lubrication for axle journals by a pressure circulation of oil, which may be substituted for the said oiling member in the known axle boxes without modifying the latter. For this purpose I provide a pump which is actuated by the vehicle axle itself and which supplies oil, preferably under pressure, to the oil grooves of the axle bearing. A double pump is employed for this purpose, so that in case of accident to one pump the other will continue to operate and will assure the circulation.

The following description with reference to the appended drawings, which are given by way of example shows an embodiment of the said invention.

Fig. 2 is a lengthwise section of the device.

Fig. 3 is a section on the line Y—Y of Fig. 2.

Fig. 4 is a section on the line Z—Z of Fig. 3.

Figure 1:
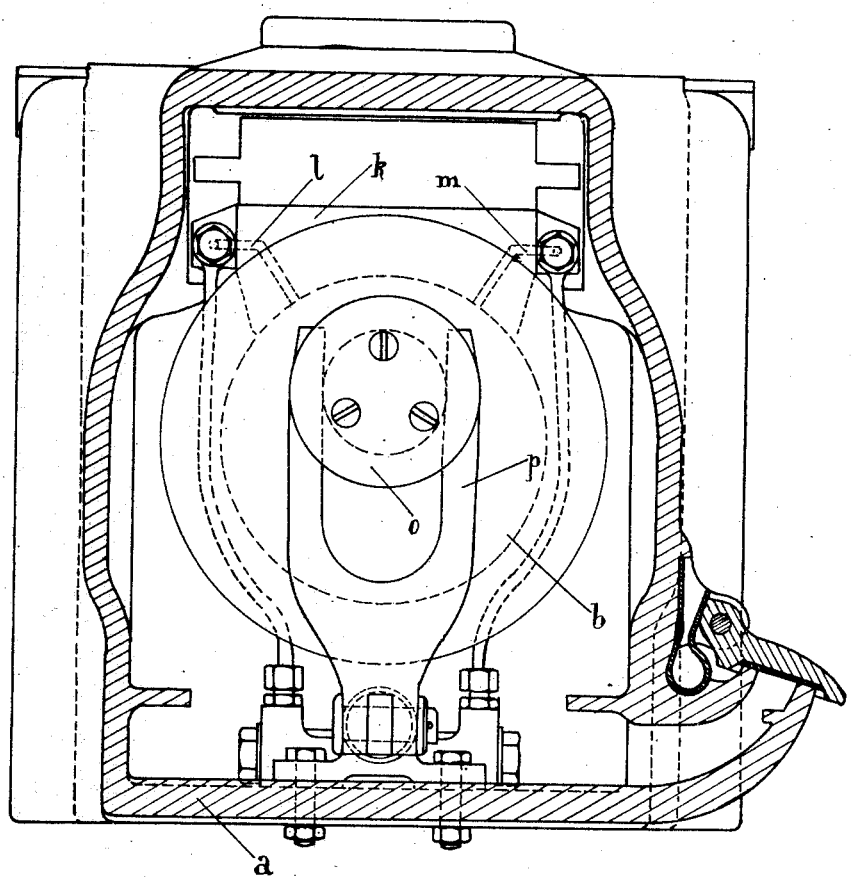
Fig. 1 is an end view of the lubricating device, the axle box being shown in section on the line X—X of Fig. 2.

The lubricating device, the object of the invention, is disposed in the interior of the axle box $a$ which surrounds the axle journal $b$. The said device essentially comprises two pistons or plungers $c$ and $d$ (Fig. 3) which are mounted on the same rod $e$ and are movable in the cylinders $c^1$ $d^1$ which are immersed in the oil contained in the casing $a$. This oil which is drawn through the orifices $f$, $g$ into the said cylinders is discharged through the respective orifices $h^1$ $i^1$ and the pipes $h$ $i$, within which is provided a respective ball or like valve member $j$ for discharge purposes (Fig. 4); the oil proceeds through the said pipes to the respective sides of the axle $b$ and into the bearing $k$. The oil passes through the ducts $l$ $m$ in the said bearing (Fig. 1) and attains the oil grooves $n$ which are shown in the dotted lines in Figs. 1 and 2.

In this manner the oil which is compressed in the cylinders $c^1$ $d^1$ will be supplied to the said oil grooves through entirely closed conduits, thus providing a pressure lubrication for the axle bearing.

The pistons $c$ $d$ are given a reciprocating motion by the eccentric disc $o$ which is secured to the head of the journal $b$ and coacts with the fork $p$ which is pivotally mounted on a shaft $q$ which is parallel with the said journal and is rotatable in the bearings $q^1$ which are separately secured, together with the device according to the invention, upon the bottom of the casing $a$. It will be noted that the rotation of the vehicle axle will effect the circumferential displacement of the disc $o$ and will thus impart an oscillating motion to the shaft $q$ by means of the lever $p$.

At the end of the shaft $q$ is a square portion upon which is mounted a cam $r$ which is shown in the section Fig. 2 offers two cheeks which extend on the respective sides of the common rod $e$ of the pistons $c$ and $d$ (Fig. 3), so that the oscillating motion of the shaft $q$ will impart a reciprocating motion to the said pistons.

Obviously, the apparatus may be suitably modified in detail without departing from the spirit of the invention. Lubrication under pressure is not essential, and the oil might be supplied by the said pump to an open recipient which delivers oil to the bearing.

What I claim is:—

1. A lubricating device for axle journals, comprising a casing which surrounds the journal and is adapted to contain oil, a pump which is disposed in the said casing and serves to withdraw the oil and to deliver it upon the said journal, an eccentric disc secured to the outer face of said journal, a fork coacting with said disc and receiving an oscillating motion due to the rotation of the axle, and means imparting the oscillating motion of the said fork to the piston of the pump.

2. A lubricating device for axle journals, comprising a casing which surrounds the journal and is adapted to contain oil, a double pump comprising two pistons mounted on a common piston rod and movable in two respective cylinders which are immersed in the oil and are adapted to withdraw the said oil, conduits connecting each cylinder of the said pump with the oil grooves of the journal bearings, an eccentric disc secured to the outer face of said journal, a fork coacting with said disc and pivotally mounted on the end of a shaft which is perpendicular to the piston rod of the pump, and means whereby the oscillating motion of the said fork shaft will be imparted to the said rod which is common to the pump pistons.

In testimony that I claim the foregoing as my invention, I have signed my name hereto.

JULES MOREAU.